(12) United States Patent
Back et al.

(10) Patent No.: US 8,429,911 B2
(45) Date of Patent: Apr. 30, 2013

(54) CHARGE AIR TEMPERATURE CONTROL SYSTEM

(75) Inventors: Peter Back, St. Leon-Rot (DE); Waldemar Stark, Frankenthal (DE)

(73) Assignee: Deere & Company, Moline, IL (US)

( * ) Notice: Subject to any disclaimer, the term of this patent is extended or adjusted under 35 U.S.C. 154(b) by 380 days.

(21) Appl. No.: 12/783,710

(22) Filed: May 20, 2010

(65) Prior Publication Data

US 2011/0120426 A1     May 26, 2011

(30) Foreign Application Priority Data

May 29, 2009    (DE) .................. 10 2009 026 613

(51) Int. Cl.
*F02B 29/04*     (2006.01)

(52) U.S. Cl.
USPC .......................... 60/599; 123/563; 123/565

(58) Field of Classification Search ............ 60/597; 123/563, 565
See application file for complete search history.

(56) References Cited

FOREIGN PATENT DOCUMENTS

| | | |
|---|---|---|
| DE | 3200682 A1 | 1/1982 |
| DE | 3200686 A1 | 1/1982 |
| DE | 3200688 A1 | 1/1982 |
| DE | 4104093 A1 | 2/1991 |
| EP | 0097230 | 1/1984 |
| EP | 0496085 | 7/1992 |
| FR | 2895452 | 6/2007 |
| GB | 2374124 | 10/2002 |
| JP | 60206934 | 10/1985 |
| WO | 98/25012 | 6/1998 |

OTHER PUBLICATIONS

Dicke, Engine Mounted Air-to-Air Aftercooler, US Patent Application Publicztion, Pub. No. US 2008/0098998 A1, May 1, 2008.*
European Search Report received Aug. 18, 2010 (7 pages).
German Search Report received on June 7, 2010 (3 pages).

* cited by examiner

*Primary Examiner* — Ching Chang

(57) ABSTRACT

A system for controlling the temperature of a charge air stream flowing through an air-cooled intercooler of a turbocharged internal combustion engine, with a fan for producing a cooling air stream acting on the intercooler and with an actuation unit for controlling the flow of cooling air as a function of charge pressure present at the intercooler.

9 Claims, 3 Drawing Sheets

CHARGE AIR TEMPERATURE CONTROL SYSTEM

FIELD OF THE INVENTION

The present invention relates to a system for controlling the temperature of a charge air stream flowing through an air-cooled intercooler for a turbocharged internal combustion engine.

BACKGROUND OF THE INVENTION

Such intercoolers are used for turbocharged internal combustion engines, particularly for diesel engines for cooling the air compressed and heated by an exhaust air turbocharger to increase the volumetric efficiency and thus the power delivery of the internal combustion engine.

In this connection, the published German application DE 10 2207 005 393 discloses a system for regulating the charge air temperature for an air-cooled intercooler in an internal combustion engine. The intercooler has an inlet area and an outlet area, wherein a temperature sensor is allocated to each of the two areas to detect the associated charge air temperature. A fan with a regulated rotational speed for producing a coolant air stream acting on the intercooler is additionally present. A regulation device adapts the rotational speed of the fan according to the charge air temperatures detected by the temperature sensors in such a manner that the charge air is cooled corresponding to a charge air temperature at the outlet area. Since this presupposes the use of a complex closed-loop regulation, the known system is comparatively expensive in construction.

SUMMARY

Accordingly, an object of this invention is to provide a simple system for controlling charge air.

This and other objects are achieved by the present invention, wherein a system for controlling the temperature of a charge air stream flowing through an air-cooled intercooler for a turbocharged internal combustion engine includes, in addition to a fan for producing a coolant air stream acting on the intercooler, a control system for controlling the coolant air according to a supplied control parameter. According to the invention, the control parameter reflects a charge pressure present at the intercooler.

The control system of the invention is based on the realization that the charge pressure produced by an exhaust gas turbocharger for a supercharged internal combustion engine increases with the engine power output, nearly independently of the rotational speed. Therefore, if the charge pressure is used as the control variable for specifying the amount of coolant air acting on the intercooler, the latter depends exclusively on the power output of the internal combustion engine. Since the amount of coolant air required to maintain a given temperature generally displays a slight decrease with increasing engine speed of the internal combustion engine, it is advantageous in assuring a constant cooling of the charge air, if the amount of coolant air is governed by the nominal engine speed, i.e., the permissible maximum engine speed of the internal combustion engine.

The control system of the invention is comparatively simple because of the open-loop control based on the charge pressure.

Since changes in the charge pressure of the type that occur because of a travel-induced fluctuating power output of the internal combustion engine propagate with a time delay in the direction of the intercooler, starting from the exhaust gas turbocharger, a preliminary control by the actuation unit can be performed, in order to reduce the thermal stress on the intercooler. For this purpose, the charge pressure is sensed, preferably in the area between an outlet of the exhaust gas turbocharger and an inlet of the intercooler.

The fan unit has a fan rotor that can be set in rotation by means of a drive device to generate the coolant air flow. The rotor comprises radially oriented pumping vanes that are uniformly arranged on the periphery of a drive shaft rotatably seated in a fan housing. A coolant air inlet communicating with the outside air, as well as coolant air outlet facing the intercooler, are constructed in the fan housing. A filter element upstream of the intercooler prevents the penetration of undesired dirt particles that are suctioned in from the outside atmosphere along with the coolant air stream and that could lead to an impairment of the cooling power of the intercooler. Together with the intercooler, the fan housing can form a cooler module accommodated in an engine compartment of a vehicle, wherein the intercooler is connected via heat-resistant rubber lines to the exhaust air turbocharger or the internal combustion engine of the motor vehicle.

The drive unit is, in particular, a hydraulic motor that can be driven by the supply of a hydraulic fluid stream under pressure, the amount of hydraulic fluid that is supplied being variable by means of the actuation unit. The hydraulic motor itself can be of conventional design and comprises a displacement piston rotating by the action of the hydraulic fluid stream and rotationally fixedly connected to the drive shaft leading out of the motor housing. The hydraulic fluid stream is generated, for example, by a hydraulic pump supplied from a hydraulic fluid storage container and driven by means of the internal combustion engine. The rotational speed of the fan motor and therefore the amount of coolant air to be provided to the intercooler can be controlled in a targeted manner by changing the amount of hydraulic fluid supplied to the hydraulic motor or by changing an adjustable displacement volume contained by the hydraulic pump or the hydraulic motor.

In particular, there is the possibility that the actuation unit has a charge air-controlled proportional valve for varying the amount of hydraulic fluid supplied to the hydraulic motor.

The proportional valve in the hydraulic fluid stream is preferably arranged parallel to the hydraulic motor as a bypass valve. The bypass valve comprises a valve slide that can be brought into a transmissive valve position as a function of the charge pressure at the control input of the bypass valve in such a manner that the proportion of the hydraulic fluid diverted around the hydraulic motor is reduced with increasing charge pressure It is further conceivable that the drive unit is connected to the fan rotor via a clutch whose engagement can be varied by the actuation unit. By varying the clutch engagement, the rotational speed of the fan rotor and thus the amount of coolant air produced to act on the intercooler can be controlled independently of the drive unit. The use of the clutch makes particular sense if the internal combustion engine is used as the drive unit, wherein it is connected do the clutch, for example, via a belt drive or a flexible shaft.

In particular, the clutch is a viscous fan clutch constructed as part of the fan unit. The clutch comprises a drive-side rotor that is arranged in a working chamber and forms several shearing gaps with the chamber walls to create a clutch engagement with an output-side housing. The working chamber is separated from a supply chamber for hydraulic fluid by a partition wall, the partition wall having several pump openings arranged peripherally, by means of which a hydraulic fluid flow in the direction of the working chamber can be produced in case of a relative rotation of the rotor with respect to the housing. In addition, several control openings that allow a backflow of hydraulic fluid into the storage chamber are arranged in the partition wall. The clutch engagement can be specifically varied by varying the amount of back-flowing hydraulic fluid by means of a proportional valve comprised by the actuation unit that is controlled by charge air.

To vary the amount of coolant air acting on the intercooler, it is further conceivable that the fan rotor has a plurality of rotor blades adjustable with respect to their pumping cross-section, the adjustment of the rotor blades being performed by means of a charge air-controlled actuation element comprised by the actuation unit. The actuation element can be deflected as a function of the charge pressure against a restoring spring force in such a manner that the rotor blades are pivoted with increasing charge pressure in the direction for enlarging the pumping cross-section.

DESCRIPTION OF THE PREFERRED EMBODIMENT

Figure 1:
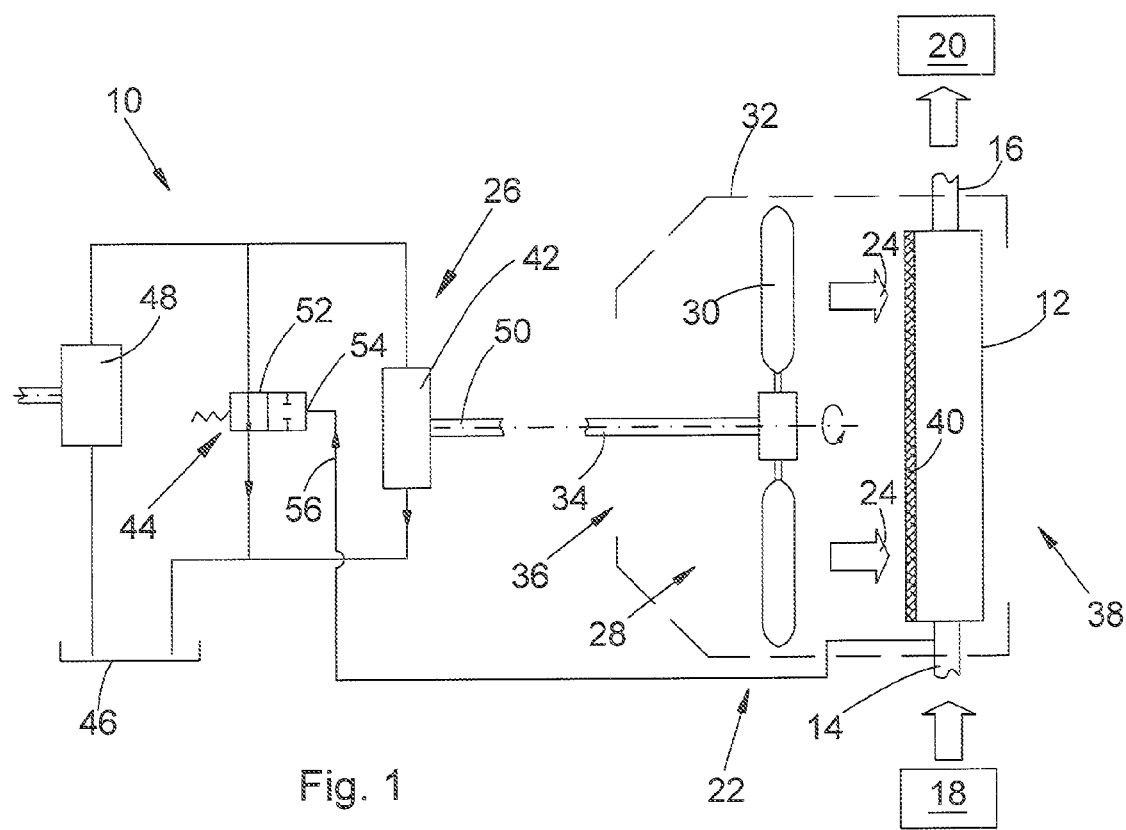
FIG. 1 is a schematic diagram of a first embodiment of the invention.

Referring to FIG. 1, the system 10 includes an air-cooled intercooler 12 that is connected on the inlet side via heat resistant rubber lines 14 to an exhaust air turbocharger 18, and on the outlet side via heat resistant rubber line 16 to a turbocharged internal combustion engine 20 of a vehicle (not shown). The engine 20 is, for example, a diesel engine. The vehicle may be an agricultural utility vehicle, such as a tractor, a harvester, a chopper, or a self-propelled spraying machine.

A fan unit 22 produces an air stream 24 acting on the intercooler 12. The fan unit 22 has a fan rotor 28 that is rotated by a drive unit 26. The rotor 28 includes a plurality of radially oriented vanes or blades 30 that are uniformly arranged on the periphery of a drive shaft 34 rotatably seated in a fan housing 32. Housing 32 forms a coolant air inlet 36 which receives outside air, as well as a coolant air outlet 38 facing the intercooler 12. A filter element 40 upstream of the intercooler 12 prevents the penetration of undesired dirt particles that are suctioned in from the outside atmosphere along with the coolant air stream 24 and that could lead to an impairment of the cooling power of the intercooler 12. The fan housing 32, together with the intercooler 12, forms a cooling module accommodated in the engine compartment (not shown) of the vehicle (not shown).

The drive unit 26 can be a hydraulic motor 42 that is driven by pressurized hydraulic fluid. The flow of hydraulic fluid can be varied by an actuation unit 44 as a function of a charge pressure present at the intercooler 12. The hydraulic fluid flow is generated, for example, by a hydraulic fluid pump 48 supplied from a hydraulic fluid storage container 46 and driven by the engine 20.

The hydraulic motor 42 is preferable of conventional design and comprises a displacement piston rotating under the influence of the hydraulic fluid stream and rotationally fixedly connected to the drive shaft 50 leading out of the motor housing. By varying the amount of hydraulic fluid supplied to the hydraulic motor 42, the rotational speed of the fan rotor 28 and thus the amount of coolant air produced to act on the intercooler 12 can be specifically controlled.

To control the amount of hydraulic fluid supplied to the hydraulic motor 42, the actuation unit 44 includes a pressure-controlled proportional valve 52. The proportional valve 52 is connected as bypass valve and in parallel to the hydraulic motor 42. The valve 52 includes a valve spool which movable in response to changes in the charge pressure at the control input 54 so that the proportion of hydraulic fluid diverted around the hydraulic motor 42 is reduced with increasing charge pressure. For this purpose, the charge pressure in the area of the inlet of the intercooler 12 is sensed and supplied to the bypass valve as control parameter via a pressure line 56.

Figure 2:
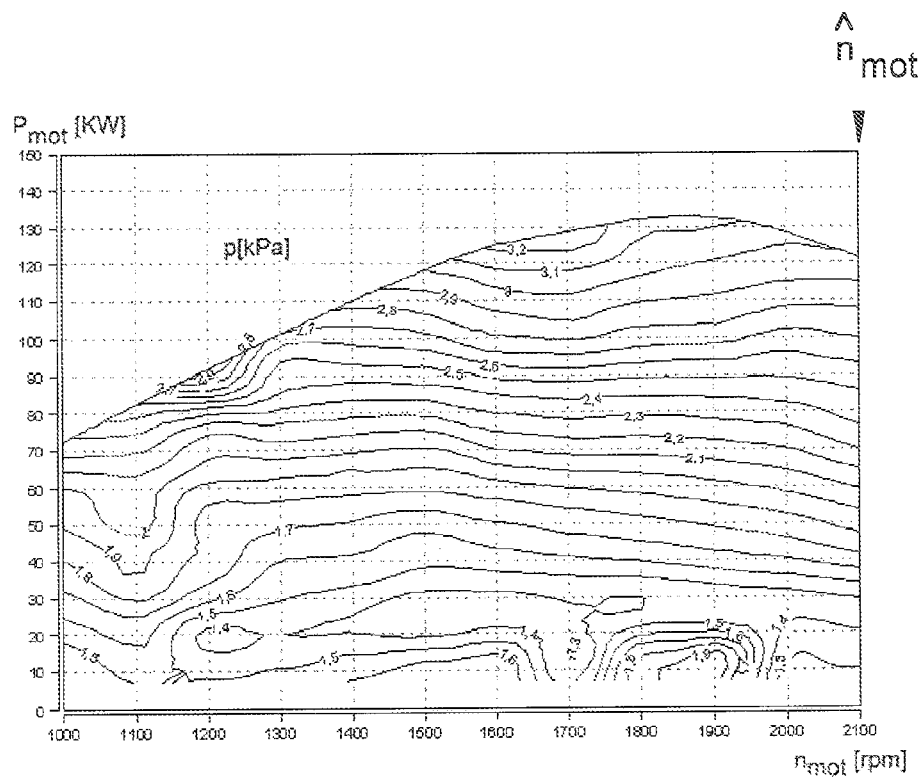
FIG. 2 is a graphical illustration of the behavior of the charge pressure as a function of the speed and power output of the internal combustion engine.

FIG. 2 graphically illustrates, for example, the behavior of the charge pressure p in the area of the inlet of the intercooler 12 as a function of the rotational speed $n_{mot}$ and the power output $P_{mot}$ of the engine 20. The charge pressure p accordingly increases nearly independently of the rotational speed $n_{mot}$ of the internal combustion engine 20 as a function of its power output $P_{mot}$. Therefore, if the charge pressure p is used as the control parameter for specifying the amount of coolant air M acting on the intercooler 12, it in turn depends almost exclusively on the power output $P_{mot}$ of the internal combustion engine 20.

Figure 3:
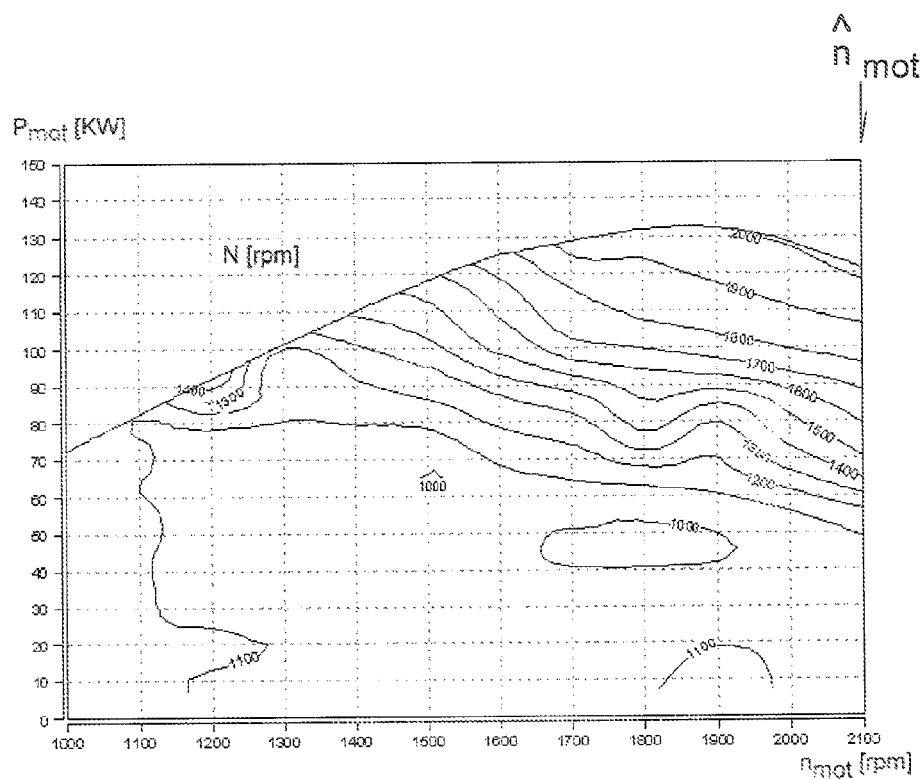
FIG. 3 is a graphical illustration of the amount of coolant air necessary to maintain a given temperature of the charge air.

FIG. 3 shows a diagram that illustrates for the sake of example the amount of coolant air M—indicated by the associated rotational speed N of the fan rotor 28—that is necessary to maintain a given temperature of the charge air, as a function of the rotational speed $n_{mot}$ and the power output $P_{mot}$ of the internal combustion engine 20. Accordingly, the amount of coolant air M displays a slight decrease with the rotational speed $n_{mot}$ of the internal combustion engine 20. It is therefore advantageous if the amount of coolant air M for assuring a uniform cooling of the charge air is governed by the nominal rotational speed, i.e., the highest permissible rotational speed of the internal combustion engine 20, wherein κ is a coefficient dependent, among other things, on the efficiency of the intercooler 12 or the fan unit 22. In this manner, sufficient cooling of the charging there is always assured.

Figure 4:
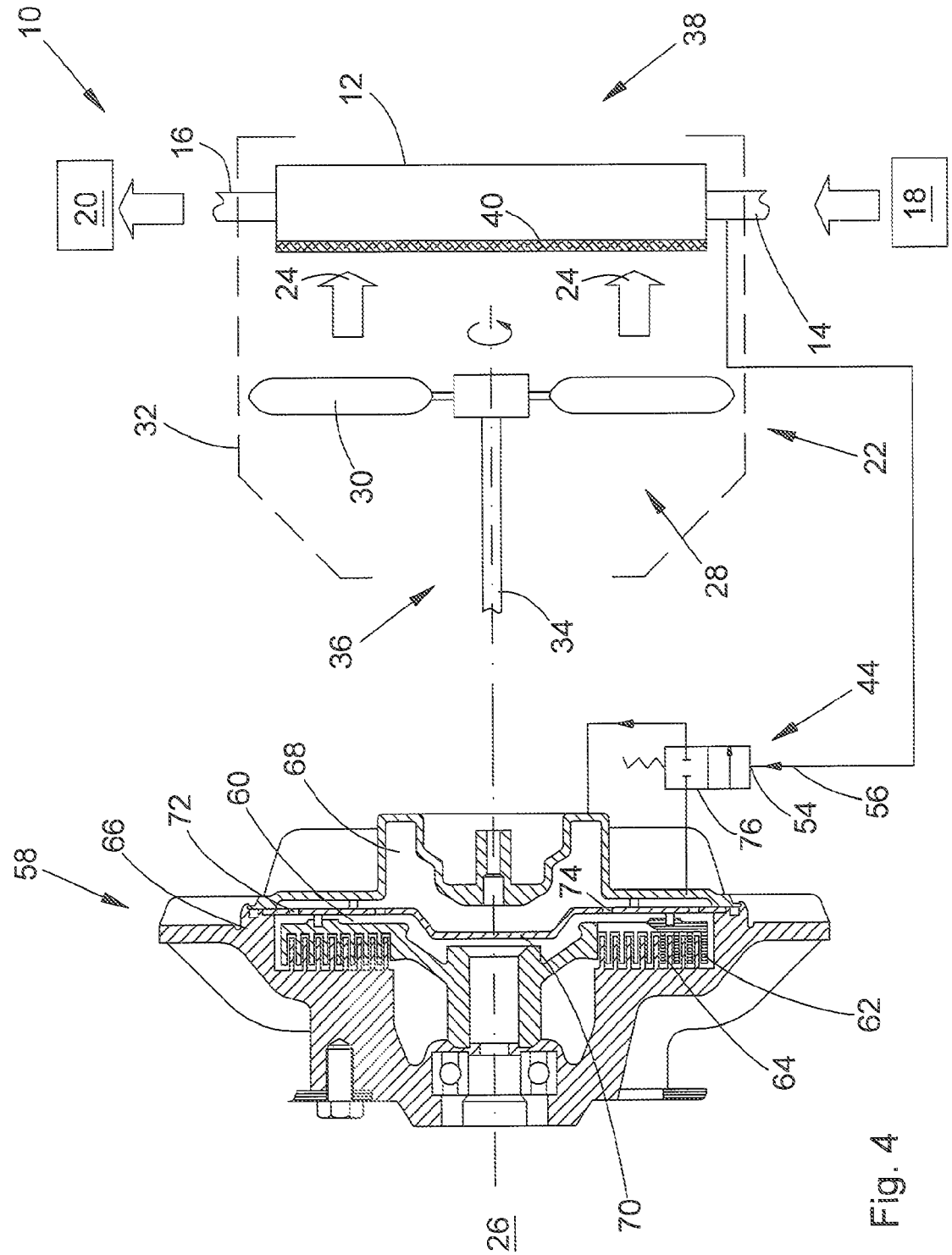
FIG. 4 is a schematic diagram of a second embodiment of the invention.

The embodiment of FIG. 4 differs from the first of FIG. 1 with respect to the manner in which the rotational speed of the fan rotor 28 is controlled. In FIG. 4, the drive unit 26 is connected to the fan rotor 28 via a clutch 58. Clutch engagement can be varied by the actuation unit 44. By varying the clutch engagement, the rotational speed of the fan rotor 28 and thus the amount of coolant air produced to act on the intercooler 12 can be controlled independently of the drive unit 26. The engine 20 is used as the drive unit 26, wherein the former is connected via a belt drive or a flexible shaft to the clutch 58.

The clutch 58 is preferably a viscous fan clutch formed as part of the fan unit 22. The clutch includes a drive-side rotor 62 enclosed in a working chamber 60 and forms several shearing gaps 64 with the walls of the chamber 60 to create a clutch engagement with an output-side housing 66. The working chamber 60 is separated from a supply chamber 68 for hydraulic fluid by a partition wall 70, the partition wall 70 having several pump openings 72 arranged peripherally, by means of which a hydraulic fluid flow in the direction of the working chamber 60 can be produced in case of a relative rotation of the rotor 62 with respect to the housing 66. In addition, several control openings 74 that allow a backflow of hydraulic fluid into the storage chamber 68 are arranged in the partition wall 70. The clutch engagement can be varied by varying the amount of back-flowing hydraulic fluid by a proportional valve 76, controlled by charge air, that forms the actuation unit 44.

Figure 5:
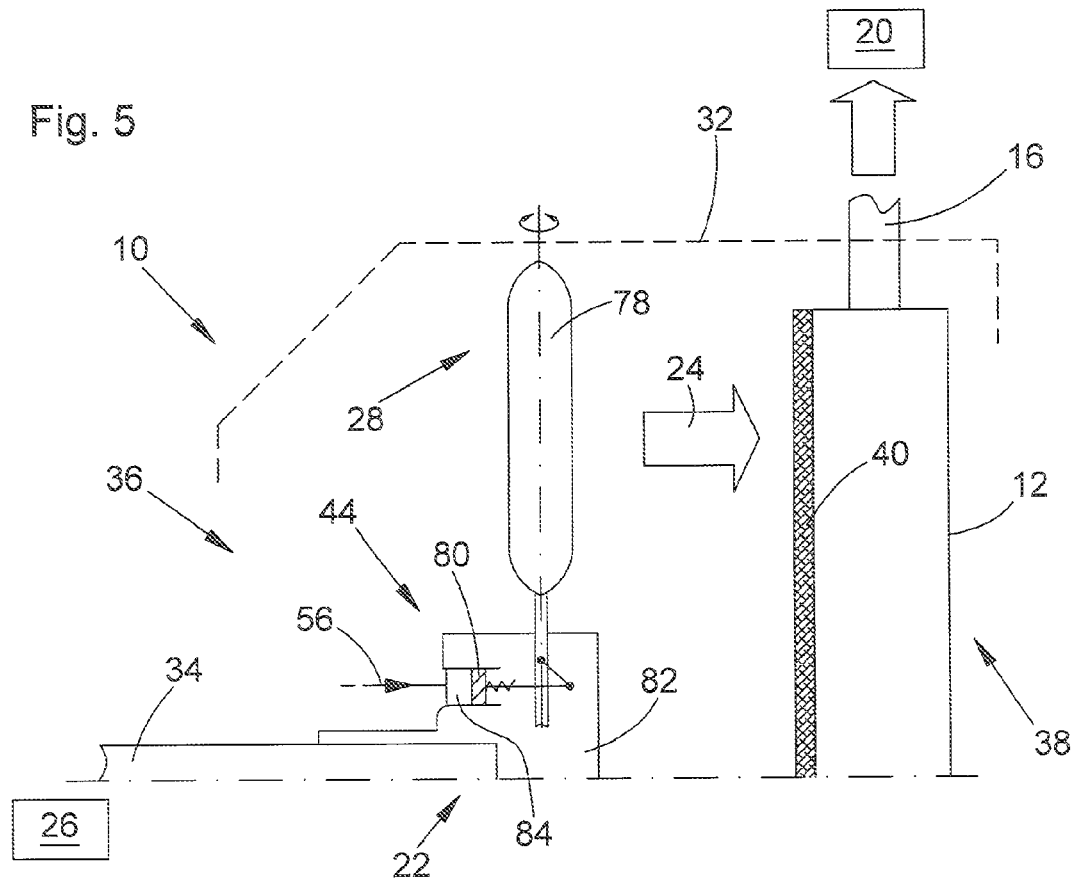
FIG. 5 is a schematic diagram of a third embodiment of the invention.

Referring now to FIG. 5, the third embodiment differs from the first embodiment of FIG. 2 with respect to the manner in which the amount of coolant air acting on the intercooler 12 is controlled. Accordingly, the fan rotor 28 includes a plurality of rotor blades 78 which are adjustable with respect to their orientation or pumping cross-section. This adjustment of the rotor blades 78 is controlled by an actuation element 80 comprised by the control unit 44. The actuation element 80 is deflected as a function of the charge pressure against a restoring spring force so that the rotor blades 78 are pivoted with increasing charge pressure in the direction for enlarging the pumping cross-section or the work angle. In this regard, a separate actuation element 80 can be associated with each of the adjustable rotor blades 78, wherein the actuation elements 80 can be acted upon by an annular channel 84 running in the periphery of a fan hub 82. The engine 20 may be connected via a belt drive (not shown) or a flexible shaft (not shown) to the drive shaft 34.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A control system for a turbocharged internal combustion engine having a fan for directing a cooling air stream at an air-cooled intercooler, wherein the fan comprises a fan rotor driven by a drive unit for generating the cooling air stream, and an actuation unit controls the amount of cooling air as a function of a charge air pressure present at the intercooler, characterized in that:

the drive unit comprises a hydraulic motor driven by a pressurized hydraulic fluid stream; and
the actuation unit includes a pressure-controlled proportional valve which controls the amount of hydraulic fluid provided to the hydraulic motor, the proportional valve being connected in parallel with the hydraulic motor and operates as a bypass valve, the proportional valve having a valve spool which is movable against a resilient member into an open position dependent on the charge air pressure present at a control input of the proportional valve so that the amount of bypassed hydraulic fluid is reduced with increasing charge air pressure.

2. The control system of claim 1, wherein:
the charge air pressure is sensed in an area between an outlet of an exhaust gas turbocharger and an inlet of the intercooler.

3. The control system of claim 1, wherein:
the fan comprises a fan rotor driven by a drive unit.

4. The control system of claim 3, wherein:
the drive unit is connected to the fan rotor via a clutch, and engagement of the clutch is controlled by the actuation unit.

5. The control system of claim 4, wherein:
the clutch is a viscous fan clutch constructed as a part of fan unit.

6. The control system of claim 1, wherein:
the drive unit comprises a hydraulic motor driven by hydraulic fluid, and the actuation unit controls the flow of hydraulic fluid to the hydraulic motor.

7. The control system of claim 6, wherein:
the proportional valve is connected in parallel with the hydraulic motor and operates as a bypass valve.

8. The control system of claim 1, wherein:
the actuation unit comprises a proportional valve controlled by the charge air pressure.

9. The control system of claim 1, wherein:
the fan rotor comprises a plurality of rotor blades adjustable with respect to their orientation; and
the actuation unit controls an actuation element which is operatively coupled to the control the orientation of the blades.

* * * * *